United States Patent [19]

Conville et al.

[11] Patent Number: 5,702,631
[45] Date of Patent: Dec. 30, 1997

[54] AQUEOUS CORROSION INHIBITOR FORMULATIONS

[75] Inventors: John J. Conville, Canton; Robert Chwalik, Farmington Hills; Shrikant V. Desai, Stout Grosse Ile; David E. Turcotte, Woodhaven; James T. Lyon, Novi, all of Mich.

[73] Assignee: Ashland Inc., Lexington, Ky.

[21] Appl. No.: 477,413

[22] Filed: Jun. 7, 1995

Related U.S. Application Data

[63] Continuation of Ser. No. 221,978, Apr. 4, 1994, abandoned, which is a continuation of Ser. No. 980,858, Nov. 24, 1992, abandoned.

[51] Int. Cl.$^6$ .................................................. C09K 5/00
[52] U.S. Cl. ............................ 252/76; 252/79; 252/396
[58] Field of Search ................................ 252/73, 75, 76, 252/79, 396

[56] References Cited

U.S. PATENT DOCUMENTS

| | | | |
|---|---|---|---|
| 4,961,878 | 10/1990 | Mullins | 252/389.3 |
| 5,290,458 | 3/1994 | Turcotte et al. | 252/76 |
| 5,290,467 | 3/1994 | Turcotte et al. | 252/76 |
| 5,290,469 | 3/1994 | Turcotte et al. | 252/76 |

*Primary Examiner*—Paul Lieberman
*Assistant Examiner*—Necholus Ogden
*Attorney, Agent, or Firm*—Middleton & Reutlinger; David W. Carrithers

[57] ABSTRACT

The present invention provides aqueous concentrated corrosion inhibition formulations suitable for addition to depleted antifreeze/coolant compositions or corrosive water that use a mixture of polymeric polycarboxylates, azoles, nitrate salts, phosphates, stabilized silicates and transition metal compounds which reduces the corrosion rate and is effective at relatively low concentrations. The formulations are particularly suitable for automotive applications.

51 Claims, No Drawings

5,702,631

AQUEOUS CORROSION INHIBITOR FORMULATIONS

This application is a Continuation of U.S. patent application Ser. No. 08/221,978 filed Apr. 4, 1994, now abandoned which is a Continuation of U.S. patent application Ser. No. 07/980,858 filed Nov. 24, 1992 now abandoned.

BACKGROUND OF THE INVENTION

1. Field of the Invention

This invention relates to aqueous corrosion inhibitor formulations and more specifically to aqueous corrosion inhibitor formulations which may be added to depleted glycol-based antifreeze/coolant compositions or to non-glycol based compositions by addition to water.

2. Description of the Prior Art

Antifreeze/coolant technology in North America uses silicate as a corrosion inhibitor. Silicates are particularly useful in protecting aluminum automotive cooling system components. The silicate corrosion inhibitors generally also use a phosphate, usually in the form of an alkali metal salt, to help protect metal cooling system parts and also as a buffer to control the pH of the coolant. Often phosphate salts are used to help maintain a stable alkaline environment from which multiple corrosion inhibitors can most effectively function.

Traditionally antifreeze/coolant is sold at nearly one-hundred percent glycol content. This concentrated packaging allows for flexibility so that the user can dilute the antifreeze/coolant, as needed, with available water to obtain the required freeze/boil protection. However, corrosion protection is needed over the entire dilution range.

In addition, during extended operation of the automotive cooling system, the corrosion inhibitor formulations in the antifreeze/coolant composition become depleted, thereby reducing corrosion inhibition.

Generally, corrosion inhibitor packages may be added to depleted antifreeze/coolant compositions to prolong the life of the antifreeze/coolant, while enhancing the corrosion inhibition properties. This has the benefit of minimizing waste and helps alleviate the growing concerns surrounding used automotive fluids. Ethylene glycol based automotive antifreeze compositions incorporating corrosion inhibitors and other additives are well known in the art. See, for example, U.S. Pat. Nos. 5,076,951 and 4,426,309. Further, aqueous based inhibitor packages for application to aqueous cooling systems are also known. See, for example, U.S. Pat. Nos. 4,961,878 and 4,749,550. Such nonautomotive, aqueous packages may incorporate additives to reduce or modify deposits. See, for example, U.S. Pat. No. 4,260,504. Cooling system cleaning solutions containing inhibitors and cleaning agents in water, as disclosed in U.S. Pat. No. 5,071,582, or ethylene glycol and water mixtures, disclosed in U.S. Pat. No. 5,062,987, are also known.

Heavy duty cooling systems have traditionally used supplemental coolant additives (SCAs) to enhance engine coolant performance. This is largely in response to engine manufacturers' recommendations which are based on the fact that commercial antifreeze is formulated to meet the operating requirements of passenger cars and not heavy duty trucks.

The shortcomings of automotive coolant for heavy duty applications and typical SCA technology are known. See, for example U.S. Pat. No. 4,717,495. For heavy duty applications, an SCA may be prepared as a slurry and used to impregnate a cooling system filter. See, for example, U.S. Pat. No. 5,071,580. A cleaner and an inhibitor formulation has been added to both heavy duty trucks and passenger cares using a recharged filter. See U.S. Pat. No. 3,962,109. Currently, cleaners are typically used intermittently and then removed from the cooling system. See, for example, U.S. Pat. Nos. 5,071,582 and 5,062,987.

Certain polycarboxylate type materials have been disclosed for prevention of precipitates in antifreeze/coolant compositions. For example, U.S. Pat. No. 3,663,448 discloses scale inhibition for industrial cooling waters using amino phosphonate and polyacrylic acid compounds. U.S. Pat. No. 3,948,792 discloses an aqueous additive mixture to reduce and modify the amount of silicate scale formed in automotive cooling systems.

European patent 245557 discloses the use of a variety of compounds including sodium polyacrylate to prevent alkaline earth metal silicate precipitation. U.S. Pat. No. 4,487,712 discloses the use of polyacrylic acid as a silicate stabilizer to inhibit gelation. Gelation is a silicate depletion mechanism which can occur separately from hard water precipitates.

The need exists for a concentrated, aqueous, dedicated automotive formulation which can simply reinhibit the existing antifreeze in the car. This alleviates the need for changing fluid, using precharged filters, using a heavy duty truck SCA in a car or cleaning the system simultaneously.

Such a formulation would be designed for modern aluminum engine based passenger car cooling systems. The formulation must be liquid, easily miscible with diluted antifreeze in the cooling system, protect all cooling system metals, have a useful shelf life, not harm automotive finishes or paint and not promote excessive cooling system foam.

BRIEF SUMMARY OF THE INVENTION

The present invention has met the above-described need by providing concentrated corrosion inhibition formulations for depleted antifreeze/coolant compositions by using polymeric polycarboxylate additives which reduce corrosion over the entire dilution range without creating precipitates. In addition, the present corrosion inhibition formulations are effective in reducing corrosion in the entire range of cooling system metals, including heat rejecting aluminum, aluminum alloys, copper, steel, cast iron, brass, solder and the like.

This formulation is soluble in alcohol, alcohol/water mixtures and water alone. The formulation of the present invention is compatible with other commonly used antifreeze/coolant components, does not corrode or damage automotive cooling systems and is effective at relatively low concentrations.

It is an object of the present invention to provide concentrated corrosion inhibition formulations for depleted antifreeze/coolant compositions with polymeric polycarboxylate additives.

It is another object of the present invention to provide concentrated corrosion inhibition formulations which reduce corrosion over the entire dilution range of antifreeze/coolant compositions with out creating precipitates.

It is an additional object of the present invention to provide corrosion inhibition formulations which are effective in reducing corrosion in the entire range of cooling system metals.

If is a further object of the present invention to provide corrosion inhibition formulations which are soluble in alcohol, alcohol/water mixtures and water alone.

It is an object of the present invention to provide corrosion inhibition formulations which are compatible with commonly used antifreeze/coolant components.

It is another object of the present invention to provide corrosion inhibition formulations which are effective at relatively low concentrations.

It is an additional object of the present invention to use polymeric polycarboxylates in the corrosion inhibition formulations to reduce the corrosion.

These and other objects of the present invention will be more fully understood from the following description of the invention.

DETAILED DESCRIPTION OF THE PREFERRED EMBODIMENTS

The present invention provides concentrated corrosion inhibition formulations for depleted antifreeze/coolant compositions by using certain polymeric polycarboxylate additives which reduce corrosion over the entire dilution range without creating precipitates.

In addition, the present corrosion inhibition formulations are effective in reducing corrosion in the entire range of cooling system metals, including heat rejecting aluminum, aluminum alloys, copper, steel, cast iron, brass, solder and the like. This formulation is soluble in alcohol, alcohol/water mixtures and in water alone and exhibits excellent stability characteristics. The corrosion inhibitor formulations are compatible with other commonly used antifreeze/coolant components and are effective at relatively low concentrations.

The concentrated corrosion inhibitor formulations of the present invention is a water-based mixture of polymeric polycarboxylates, nitrate salts, phosphate, azoles, stabilized silicates and transition metal compounds. Optionally, other components including defoamers, dyes, bittering agents, biocides, and the like may be added to the present formulation.

The preferred class of stabilizing polymeric polycarboxylates are based on polyacrylic acid (PAA) and/or polymaleic acid (PMA). These polymeric polycarboxylates are compatible with other components in the typical antifreeze/coolant composition, and present no additional toxicity or disposal concerns.

Other polymeric polycarboxylate materials which are useful in the present invention include Belclene water treatment additives from Ciba-Geigy, Colloid additives from Colloids, Inc., Good-rite polyacrylates and Carbopol resins from BF Goodrich and the like.

The molecular weight distribution of useful materials may average about one hundred grams/mole to about three million grams/mole. Chemically, the materials should be based on polymers and copolymers of acrylic acid and maleic acid, including any modifiers, such as alcohols.

The polycarboxylates used in the present invention have a molecular weight range of from about 1,200 to about 250,000, with a preferred range of from 500 to 12,000. More specifically, the most preferred additives have average molecular weights in the range of about 500 to about 4,000, and more specifically about 1300 to about 1800 and about 300 to about 4600.

When reference is made to polycarboxylates within the context of the present invention it is understood to encompass those water-soluble homo- and copolymers having at least one monomeric unit containing $C_{3-6}$ monoethylenically unsaturated mono- or dicarboxylic acids or their salts. Suitable monocarboxylic acids of this type are for example, acrylic acid, methacrylic acid, ethacrylic acid, vinylacetic acid, allylacetic acid, and crotonic acid. The preferable monocarboxylic acids from this group are acrylic acid and methacrylic acid. A further component of the polycarboxylate comprises monoethylenically unsaturated $C_{4-6}$ dicarboxylic acids, for example, maleic acid, itaconic acid, citraconic acid, mesaconic acid, fumaric acid, or methylenemalonic acid. The preferred acid is maleic acid.

Other organic substituents may be used as comonomers or as modifiers added along the polymer chain. Examples of such are shown as Formula I.

where R=H or a secondary alcohol such as isopropanol, X=COOH, COO⁻ Na+, methylvinylether, isobutylene, vinyl acetate, acrylamide, or styrene, with the proviso that when R=a secondary alcohol, X=COOH or COO⁻Na+, and when X=any other above referenced group, R=H. The preferred polycarboxylates are a copolymer of acrylic acid and maleic acid, or their sodium salts, said copolymer having a molecular weight of 3000, and a sodium salt of polyacrylic acid modified with a secondary alcohol such a isopropanol, said polymer having a molecular weight of 4000.

The polycarboxylates used in the present invention are obtained by methods well known to those skilled in the art. The general method of synthesis is via free acid radical polymerization. The polymerization may be carried out in an aqueous medium, in the presence of polymerization initiators, with or without regulants. The polymerization can take various forms; for example, the monomer(s) can be polymerized batchwise in the form of aqueous solutions. It is also possible to introduce into the polymerization reactor a portion of the monomer(s) and a portion of the initiator, to heat the mixture in an inert atmosphere to the polymerization temperature and then to add the remaining monomer(s) and initiator to the reactor at the rate of polymerization. Polymerization temperatures range from 20° C. to 200° C. At temperatures above 100° C., pressure vessels are employed.

The carboxyl containing monomers can be polymerized in the free carboxylic acid form, in the partial neutralized form, or completely neutralized. The neutralization is preferably effected with alkali metal or ammonium base.

The polymerization initiators used are preferably water soluble free radical formers such as hydrogen peroxide, peroxodisulfates and mixtures of the two. The polymerization may also be started with water insoluble initiators such as dibenzoyl peroxide, dilaurylperoxide, or azodiisobutyronitrile. The polymerization may be carried out in the presence of regulants. Examples of such regulants include water soluble mercaptans, ammonium formate, and hydroxylammonium sulfate.

Examples of the polycarboxylates which may be used in the present invention are those marketed by BASF under the trademark SOKALAN® polycarboxylates, which are available in aqueous polymer solutions.

6 The polymeric polycarboxylate is effective at enhancing stability at relatively low concentrations, generally about 100 to about 1000 ppm per total volume of inhibitor concentrate. The polymeric polycarboxylate is preferably present in the formulation in an amount of about 0.001 to about 10.0 percent by weight, and more preferably in an amount of about 0.01 to about 0.1 percent by weight.

While particularly preferred additive, Sokalan® CP 12S or CP10S, has been shown to be particularly effective at about 0.07 weight percent in one inhibitor concentrate, other levels of additive and different polycarboxylates may also be used.

Azole compounds suitable in the present invention include, salts of mercaptobenzothiazole, salts of tolytriazole, benzotriazole, mixtures thereof and the like. The most preferred azoles are salts of mercaptobenzothiazole and salts of tolytriazole. These azoles are preferably present in a fifty percent concentration.

Azoles are present in the formulation to inhibit corrosion of yellow metal like copper and brass. Brass thermostats and radiator caps are common as well as copper and brass radiators.

The azoles are preferably present in the formulation in an amount of about 0.01 to about 10.0 percent by weight, and more preferably in an amount of about 1.0 to about 4.0 percent by weight. The most preferred composition is the use of sodium mercaptobenzothiazole and sodium tolytriazole in a 3 to 1 ratio, and more preferably, in a 2.5 to 1 ratio.

Nitrate salts suitable in the present invention include, sodium nitrate, potassium nitrate, magnesium nitrate, calcium nitrate, lithium nitrate, mixtures thereof and the like. Any compatible salt may be used including sodium, potassium, lithium, magnesium, calcium and the like. The most preferred nitrate salt is sodium nitrate.

Nitrate salts serve to inhibit corrosion in the formulations of the present invention. The nitrate salt is preferably present in the formulation in an amount of about 0 to about 10.0 percent by weight, and more preferably in an amount of about 1.0 to about 3 percent by weight.

The stabilized silicone/silicate technology is disclosed in U.S. Pat. Nos. 4,370,255; 4,362,644 and 4,354,002, all hereby incorporated by reference.

Silicone/silicates are used to inhibit corrosion in the formulation of the present invention. The silicone silicates are preferably present in the formulation in an amount of about 0.1 to about 10.0 percent by weight, and more preferably in an amount of about 2.0 to about 6.0 percent by weight.

Phosphates suitable in the present invention include, dipotassium phosphate, disodium phosphate, monopotassium phosphate, tripotassium phosphate, monosodium phosphate, trisodium phosphate, mixtures thereof and the like. Any compatible salt may be used including sodium, potassium, lithium, and the like. The most preferred phosphate is a dipotassium phosphate. The phosphates are preferably present in a fifty percent solution.

Phosphates serve to buffer and inhibit corrosion in the formulations of the present invention. The phosphate is preferably present in the formulation as fifty percent dipotassium phosphate in an amount of about 0.1 to about 10.0 percent by weight, and more preferably in an amount of about 1.0 to about 4.0 percent by weight.

Transition metal compounds suitable for use in the present invention include, disodium salt dihydrate of molybdic acid, sodium molybdate·$2H_2O$, molybdenum trioxide, silicoheteropolymolybdates, phosphoroheteropolymolybdates, mixtures thereof and the like. Any compatible transition metal may be used, including for example, molybdate, cobalt, cerium, mixtures thereof and the like. In addition, any acid salt may be used including sodium, potassium, lithium, calcium, magnesium and the like. The most preferred transition metal compound is the disodium salt dihydrate of molybdic acid or sodium molybdate·$2H_2O$.

Transition metal acids are used to inhibit corrosion in formulations of the present invention. The transition metal compound is preferably present in the formulation in an amount of about 0.001 to about 10.0 percent by weight, and more preferably in an amount of about 0.01 to about 0.1 percent by weight.

In addition, defoamers may be optionally added. Any suitable defoamer, well known in the art, is suitable for the present formulations. Suitable defoamers include, for example, Pluronic® L-61 non-ionic surfactant (commercially available from BASF Corporation) or Patcote®415 liquid defoamer (commercially available from Patco Specialty Chemicals Division, American Ingredients Company). The defoamer may be present in an amount up to about 10.0 percent by weight and more preferably present in an amount of about 0.001 to about 10.0 percent by weight, and most preferably, in an amount of about 0.01 to about 0.04 percent by weight.

In addition to silicate-phosphate type coolants, these corrosion inhibitor formulations may be added to silicate-borax, amine-phosphate, amine-borax, organic acid-phosphate organic acid-borax type coolants, and the like. The corrosion inhibitor formulations may be used in automotive applications.

The most preferred antifreeze/coolant composition is a depleted silicate-phosphate type having about 94% antifreeze grade glycols. While ethylene glycol is preferred in the present invention, propylene glycol and mixtures of ethylene glycol and propylene glycol may also be used.

The following examples serve to further illustrate the present invention and should in no way be construed as limiting the scope thereof.

EXAMPLES

A modified version of ASTM D-1384-87 was used to evaluate the corrosion inhibitor formulations of the present invention. ASTM D-1384-87 is the standard test method for corrosion testing of engine coolants in glassware. ASTM D-1384-87 simulates the real world operating conditions of cooling systems.

Formulations used the following examples are presented in Table 1.

TABLE 1

| Formulations | A | B | C | D | E |
|---|---|---|---|---|---|
| Components (wt %) | | | | | |
| Distilled Water | 88.29 | 88.16 | 91.64 | 88.16 | 89.09 |
| Na Nitrate | 2.00 | 2.00 | 2.00 | 2.00 | 2.00 |
| 50% dipotassium Phosphate | 3.00 | 3.50 | 2.50 | 3.50 | 3.50 |
| 50% Na Mercapto-Benzothiazole | 2.00 | 2.00 | 2.50 | 2.00 | 2.00 |
| Na Molybdate $2H_2O$ | — | 0.04 | 0.04 | 0.04 | — |
| 50% Na Tolytriazole | 0.80 | 0.80 | — | 0.80 | 0.80 |
| Silicone/silicate mixture | 3.80 | 2.50 | 1.25 | 2.50 | 2.50 |
| Molybdic Acid, disodium salt-dihydrate | 0.04 | — | — | — | 0.04 |
| 50% NaOH | — | 0.94 | — | 0.93 | — |
| SOKALAN® CP-12S | 0.07 | — | 0.07 | 0.07 | 0.07 |
| SOKALAN® CP-10 | — | 0.06 | — | — | — |

Formulation A of Table 1 was evaluated at 6.8%, 13.6% and 3.3% in a 33.3% solution of ethylene glycol/ASTM corrosive water, as well as to two competitive products (1 and 2) in Table 2.

A 6.8 percent formulation was used because this would approximate the level found in an automobile cooling system (assuming a ten quart system with one 14.5 fluid ounce bottle of the formulations of the present invention being added).

The temperature, test duration, and metal specimen cleaning procedures were all conducted according to ASTM D-1384-87 specifications. A 33% solution of ethylene glycol was used as a negative control. Weight change results for a ethylene glycol baseline control, Formulation A (added at 6.8%, 13.6% and 33.3%), two competitive products (both added at 6.8%) and the ASTM specifications required to pass are given. The ethylene glycol baseline was run as a 33% solution of ethylene glycol/ASTM corrosive water. All weight changes are in milligrams per coupon (mg/coupon).

from this Table show that Formulations B–D, like Formulation A, passed the ASTM tests, while the competitive products failed.

TABLE 2

| Metal Coupon | Spec. To Pass | Ethylene Glycol | w/6.8% Form A | w/13.6% Form A | w/33.3% Form A | w/6.8% Comp. 1 | w/6.8% Comp. 2 |
|---|---|---|---|---|---|---|---|
| Copper | −10 | −1.2 | +1.2 | +2.3 | +1.7 | −23.0 | −9.5 |
| 2006 Solder | −30 | −210.0 | −2.4 | −0.5 | +1.3 | −18.0 | −42.0 |
| Brass | −10 | −5.4 | −0.2 | +0.6 | +1.2 | −24.0 | −17.0 |
| Mild Steel | −10 | −100.0 | +0.4 | +1.3 | +2.2 | −1.6 | +2.3 |
| Cast Iron | −10 | −499.0 | −5.7 | +3.1 | +9.1 | −45.0 | −8.0 |
| Aluminum | −30 | −79.0 | +4.8 | +6.1 | +3.2 | −28.0 | −61.0 |
| TEST RESULT | | | PASS | PASS | PASS | FAIL | FAIL |

The results from Table 2 show that Formulation A passed the ASTM tests, while the competitive products failed.

TABLE 4

| Metal Coupon | Spec. To Pass | Ethylene Glycol | w/6.8% Form B | w/6.8% Form C | w/6.8% Form D | w/6.8% Comp. 1 | w/6.8% Comp. 2 |
|---|---|---|---|---|---|---|---|
| Copper | −10 | −1.2 | +2.2 | +2.2 | +2.7 | −23.0 | −9.5 |
| 2006 Solder | −30 | −210.0 | −84.0 | −23.0 | −1.5 | −18.0 | −42.0 |
| Brass | −10 | −5.4 | +1.1 | 0.0 | +1.8 | −24.0 | −17.0 |
| Mild Steel | −10 | −100.0 | +0.5 | +0.8 | +0.1 | −1.6 | +2.3 |
| Cast Iron | −10 | −499.0 | +5.0 | −85.0 | −86.0 | −45.0 | −8.0 |
| Aluminum | −30 | −79.0 | −18.0 | +0.6 | −0.4 | −28.0 | −61.0 |
| TEST RESULT | | | PASS | PASS | PASS | FAIL | FAIL |

In Table 3, Formulation A of Table 1 was tested in ASTM corrosive water in the absence of ethylene glycol at additions of 6.8%, 13.6% and 33%. ASTM corrosive water (100%) was evaluated as a baseline.

TABLE 3

| Metal Coupon | Spec. To Pass | ASTM Water | w/6.8% Form A | w/13.6% Form A |
|---|---|---|---|---|
| Copper | −10 | +2.2 | +2.5 | +0.5 |
| 2006 Solder | −30 | −51.0 | −1.2 | −1.4 |
| Brass | −10 | −0.2 | −0.4 | −0.7 |
| Mild Steel | −10 | −312.5 | +0.3 | −0.2 |
| Cast Iron | −10 | −108.0 | +1.9 | +1.0 |
| Aluminum | −30 | −200.0 | +5.3 | +7.6 |
| TEST RESULT | | | PASS | PASS |

The results from Table 3 show that Formulation A passed the ASTM test, even in 100% ASTM corrosive water.

Formulation A of Table 1 was added at 6.8% and 13.6% to a solution of 33% commercial antifreeze/ASTM corrosive water to determine compatibility and over-concentration problems (precipitants). The results were negative. No precipitates occurred.

The performance of formulations B–D of Table 1 were evaluated using the procedure described above in comparison to two competitive products (Table 2). As shown in Table 4, there were significant performance improvements when compared to the competitive products. The results Formulation E of Table 1 was evaluated in a used engine dynamometer antifreeze sample. The results of this test are shown in Table 5. In particular, this test closely simulates the expected real world coolant to which the formulations of the present invention will be added and further illustrates benefits of the present invention.

The glassware test was performed on Formulation E spike at 6.8% in the spent coolant. The unspiked dynomometer sample was run at 66% with the balance being ASTM corrosive water. The additivized solution was tested side-by-side with an unadditivized solution and the weight losses were compared in Table 5. The rejuvenated (additivized) test solution improved the corrosion results of all metals. The weight loss of cast iron improved from −46 mg/coupon to +2.6 mg/coupon.

TABLE 5

| Metal Coupon | Unspiked Dyno Sample | Dyno Sample w/6.8% Form. E |
|---|---|---|
| Copper | +2.5 | +2.8 |
| 2006 Solder | −2.4 | −0.1 |
| Brass | +0.9 | +1.7 |
| Mild Steel | −1.0 | −0.1 |
| Cast Iron | −46.0 | +2.6 |
| Aluminum | −8.3 | +1.6 |
| TEST RESULT | PASS | PASS |

Formula A from Table 1 was evaluated by a modified ASTM D 1881-86 procedure. This test is intended for automotive coolants and was modified to evaluate the concentrated inhibitor packages of the present invention. The results are summarized in Table 6.

TABLE 6

|  | Foam Volume (ml) | Break Time (sec.) |
|---|---|---|
| Formulation A | 50 | 2.5 |
| ASTM Specification (maximum allowable) | 150 | 5.0 |

As is shown in Table 6, Formulation A passed the ASTM test.

No effect on automotive finishes was observed by ASTM D 1882 for Formulation A.

Whereas particular embodiments of the invention have been described above for purposes of illustration, it will be appreciated by those skilled in the art that numerous variations of the details may be made without departing from the invention as described in the appended claims.

What is claimed is:

1. An aqueous concentrated corrosion inhibitor solution for addition to glycol-based automotive antifreeze/coolant compositions having depleted corrosion-inhibiting characteristics, said solution consisting essentially of a corrosion inhibiting effective amount of:

a polymeric polycarboxylate which is at least one selected from the group consisting of (i) a secondary alcohol modified polyacrylic acid, and (ii) a sodium salt of a copolymer of acrylic acid and maleic acid;

a nitrate salt selected from sodium nitrate, potassium nitrate, magnesium nitrate, calcium nitrate and/or lithium nitrate;

an azole compound selected from sodium mercaptobenzothiazole and sodium tolytriazole;

a silicate compound;

a transition metal compound selected from disodium salt dihydrate of molybdic acid, sodium molybdate·2H$_2$O, molybdenum trioxide, silicoheteropolymolybdates and/or phosphoroheteropolymolybdates; and a phosphate salt.

2. The aqueous concentrated corrosion inhibitor solution of claim 1, wherein said polymeric polycarboxylate is present in amount of between about 0.001% to about 10.0 wt. %.

3. The aqueous concentrated corrosion inhibitor solution of claim 1, wherein said polymeric polycarboxcylate has a molecular weight in a range of between about 500 to 12,000.

4. The aqueous concentrated corrosion inhibitor solution of claim 1, wherein said polymeric polycarboxcylate has a molecular weight in a range of between about 500 to 4,000.

5. The aqueous concentrated corrosion inhibitor solution of claim 1, wherein said polymeric polycarboxcylate has a molecular weight in a range of between about 500 to 1,800.

6. The aqueous concentrated corrosion inhibitor solution of claim 1, wherein said azole compound is a mixture of sodium mercaptobenzothiazole and sodium tolytriazole.

7. The aqueous concentrated corrosion inhibitor solution of claim 6, wherein said sodium mercaptobenzothiazole and sodium tolytriazole are present in a about a 3 to 1 ratio.

8. The aqueous concentrated corrosion inhibitor solution of claim 1, wherein said azole compound is present in a about a 50% concentration.

9. The aqueous concentrated corrosion inhibitor solution of claim 1, wherein said nitrate salt is sodium nitrate.

10. The aqueous concentrated corrosion inhibitor solution of claim 1, wherein said nitrate salt is present in an amount between about 1 wt % to about 10 wt %.

11. The aqueous concentrated corrosion inhibitor solution of claim 1, wherein said nitrate salt is present in an amount between about 1 wt % to about 3 wt %.

12. The aqueous concentrated corrosion inhibitor solution of claim 1, wherein said phosphate salt is at least one selected from the group consisting of dipotassium phosphate, disodium phosphate, monopotassium phosphate, tripotassium phosphate, monosodium phosphate, and trisodium phosphate.

13. The aqueous concentrated corrosion inhibitor solution of claim 1, wherein said phosphate salt is a dipotassium phosphate.

14. The aqueous concentrated corrosion inhibitor solution of claim 1, wherein said phosphate salt is present in about a 50% solution.

15. The aqueous concentrated corrosion inhibitor solution of claim 1, wherein said transition metal compound is the disodium salt dihydrate of molybdic acid.

16. The aqueous concentrated corrosion inhibitor solution of claim 1, including a defoamer.

17. The aqueous concentrated corrosion inhibitor solution of claim 16, wherein said defoamer is present in an amount between about 0.001 to about 10.0 wt. %.

18. The aqueous concentrated corrosion inhibitor solution of claim 1, including a bittering agent.

19. The aqueous concentrated corrosion inhibitor solution of claim 1, including a dye.

20. The aqueous concentrated corrosion inhibitor solution of claim 1, including a biocide.

21. The aqueous concentrated corrosion inhibitor solution of claim 1, wherein said silicate is present in an amount between about 0.1 to about 10.0 wt. %.

22. The aqueous concentrated corrosion inhibitor solution of claim 1, wherein said silicate is present in an amount between about 2.0 to about 6.0 wt. %.

23. The aqueous concentrated corrosion inhibitor solution of claim 1, wherein said aqueous concentrated corrosion inhibitor composition is added to an antifreeze coolant composition selected from the group consisting of ethylene glycol coolants, propylene glycol coolants, ethylene and propylene glycol coolant mixtures, water, silicate-phosphate coolants, silicate-borax coolants, amine phosphate coolants, amine-borax coolants, and organic acid-phosphate organic acid-borax coolants.

24. The concentrated corrosion inhibitor solution of claim 1, wherein said silicate is an aqueous silicate.

25. The concentrated corrosion inhibitor solution of claim 1, wherein the balance is water.

26. An aqueous concentrated corrosion inhibitor solution for addition to glycol-based automotive antifreeze/coolant compositions having depleted corrosion-inhibiting characteristics, said solution consisting essentially of a corrosion inhibiting effective amount of:

a polymeric polycarboxylate which is at least one selected from the group consisting of (i) a secondary alcohol modified polyacrylic acid, and (ii) a sodium salt of a copolymer of acrylic acid and maleic acid;

a nitrate salt selected from sodium nitrate, potassium nitrate, magnesium nitrate, calcium nitrate and/or lithium nitrate;

an azole compound selected from sodium mercaptobenzothiazole and sodium tolytriazole;

a silicone-silicate copolymer;

a transition metal compound selected from disodium salt dihydrate of molybdic acid, sodium molybdate·2H$_2$O, molybdenum trioxide, silicoheteropolymolybdates and/or phosphoroheteropolymolybdates; and a phosphate salt.

27. The aqueous concentrated corrosion inhibitor solution of claim 26, wherein said polymeric polycarboxylate is present in amount of between about 0.001% to abut 10.0 wt. %.

28. The aqueous concentrated corrosion inhibitor solution of claim 26, wherein said polymeric polycarboxylate has a molecular weight in a range of between about 500 to 12,000.

29. The aqueous concentrated corrosion inhibitor solution of claim 26, wherein said polymeric polycarboxylate has a molecular weight in a range of between about 500 to 4,000.

30. The aqueous concentrated corrosion inhibitor solution of claim 26, wherein said polymeric polycarboxylate has a molecular weight in a range of between about 500 to 1,800.

31. The aqueous concentrated corrosion inhibitor solution of claim 26, wherein said azole compound is a mixture of sodium mercaptobenzothiazole and sodium tolytriazole.

32. The aqueous concentrated corrosion inhibitor solution of claim 31, wherein said sodium mercaptobenzothiazole and sodium tolytriazole are present in a about a 3 to 1 ratio.

33. The aqueous concentrated corrosion inhibitor solution of claim 26, wherein said azole compound is present in a about a 50% concentration.

34. The aqueous concentrated corrosion inhibitor solution of claim 26, wherein said nitrate salt is sodium nitrate.

35. The aqueous concentrated corrosion inhibitor solution of claim 26, wherein said nitrate salt is present in an amount between about 1 wt % to about 10 wt %.

36. The aqueous concentrated corrosion inhibitor solution of claim 26, wherein said nitrate salt is present in an amount between about 1 wt % to about 3 wt %.

37. The aqueous concentrated corrosion inhibitor solution of claim 26, wherein said phosphate salt is at least one selected from the group consisting of dipotassium phosphate, disodium phosphate, monopotassium phosphate, tripotassium phosphate, monosodium phosphate, and trisodium phosphate.

38. The aqueous concentrated corrosion inhibitor solution of claim 26, wherein said phosphate salt is a dipotassium phosphate.

39. The aqueous concentrated corrosion inhibitor solution of claim 26, wherein said phosphate salt is present in about a 50% solution.

40. The aqueous concentrated corrosion inhibitor solution of claim 26, wherein said transition metal compound is the disodium salt dihydrate of molybdic acid.

41. The aqueous concentrated corrosion inhibitor solution of claim 26, including a defoamer.

42. The aqueous concentrated corrosion inhibitor solution of claim 41, wherein said defoamer is present in an amount between about 0.001 to about 10.0 wt. %.

43. The aqueous concentrated corrosion inhibitor solution of claim 26, including a bittering agent.

44. The aqueous concentrated corrosion inhibitor solution of claim 26, including a dye.

45. The aqueous concentrated corrosion inhibitor solution of claim 26, including a biocide.

46. The aqueous concentrated corrosion inhibitor solution of claim 26, wherein said silicone-silicate copolymer is present in an amount between abo'ut 0.1 to about 10.0 wt. %.

47. The aqueous concentrated corrosion inhibitor solution of claim 26, wherein said silicone-silicate copolymer is present in an amount between about 2.0 to about 6.0 wt. %.

48. The aqueous concentrated corrosion inhibitor solution of claim 26, wherein said aqueous concentrated corrosion inhibitor composition is added to an antifreeze coolant composition selected from the group consisting of ethylene glycol coolants, propylene glycol coolants, ethylene and propylene glycol coolant mixtures, water, silicate-phosphate coolants, silicate-borax coolants, amine phosphate coolants, amine-borax coolants, and organic acid-phosphate organic acid-borax coolants.

49. The concentrated corrosion inhibitor solution of claim 26, wherein said silicone-silicate copolymer is selected from the group consisting of alkali siliconate silylalkylphosphonates and salts thereof, arylalkyl silicone sulfonate-silicates and salts thereof, and sulfosiloxane-silicates and salts thereof.

50. The concentrated corrosion inhibitor solution of claim 26, wherein said silicone-silicate copolymer is an aqueous silicone-silicate compound said silicone-silicate compound being selected from the group consisting of alkali siliconate silylalkylphosphonates and salts thereof, arylalkyl silicone sulfonate-silicates and salts thereof, and sulfosiloxane-silicates and salts thereof.

51. The concentrated corrosion inhibitor solution of claim 26, wherein the balance is water.

* * * * *